(12) United States Patent
Ejima et al.

(10) Patent No.: US 7,129,991 B2
(45) Date of Patent: Oct. 31, 2006

(54) TRANSMISSION METHOD OF DIGITAL AUDIO DATA WITH VIDEO DATA

(75) Inventors: Naoki Ejima, Osaka (JP); Toshiroh Nishio, Osaka (JP); Akihisa Kawamura, Osaka (JP); Hidekazu Suzuki, Osaka (JP); Sho Murakoshi, Tokyo (JP); Tetsuya Hiroe, Tokyo (JP); Hiroshige Okamoto, Tokyo (JP)

(73) Assignees: Sony Corporation (JP); Matsushita Electric Industrial Co., Limited (JP)

( * ) Notice: Subject to any disclaimer, the term of this patent is extended or adjusted under 35 U.S.C. 154(b) by 653 days.

(21) Appl. No.: 10/240,156

(22) PCT Filed: Jan. 29, 2002

(86) PCT No.: PCT/JP02/00664

§ 371 (c)(1),
(2), (4) Date: Mar. 26, 2003

(87) PCT Pub. No.: WO02/062064

PCT Pub. Date: Aug. 8, 2002

(65) Prior Publication Data

US 2003/0169370 A1  Sep. 11, 2003

(51) Int. Cl.
*H04N 7/84* (2006.01)

(52) U.S. Cl. .................................... 348/482; 348/484
(58) Field of Classification Search ........ 348/480–485, 348/462, 738, 512, 515, 473, 476; 386/39, 386/96, 102, 104; *H04N 7/08, 7/84, 7/87*
See application file for complete search history.

(56) References Cited

U.S. PATENT DOCUMENTS 5,751,366 A * 5/1998 Hobbs .................... 348/480
5,761,303 A * 6/1998 Hobbs et al. ............ 380/237

FOREIGN PATENT DOCUMENTS

| JP | 60174958 | 11/1985 |
|---|---|---|
| JP | 04008979 | 2/1992 |
| JP | 05064171 | 3/1993 |
| JP | 06080556 | 10/1994 |
| JP | 08046956 | 2/1996 |
| JP | 08154084 | 6/1996 |
| JP | 09179536 | 7/1997 |
| JP | 11289522 | 10/1999 |

OTHER PUBLICATIONS

Digital Display Working Group, Digital Visual Interface DVI, Apr. 2, 1999, Revision 1.0, p. 24-32, http://www.ddwg.org/register/index.php3.

* cited by examiner

*Primary Examiner*—Sherrie Hsia
(74) *Attorney, Agent, or Firm*—Lerner,David,Littenberg, Krumholz & Mentlik, LLP

(57) ABSTRACT

Digital audio data that have a predetermined packet structure are divided into units including a predetermined number of bits; each unit of the divided digital audio data is converted into specific data to be encoded; the encoded data are arranged in blanking intervals of video data; the digital audio data are transmitted along with the video data using a transmission line for the video data, and the video data and the audio data are simultaneously and favorably transmitted, adopting an existing video-data transmission format, such as the DVI standard.

24 Claims, 10 Drawing Sheets

FIG. 7

| C1 | C0 | CTL Code |
|----|----|----------|
| 0 | 0 | 0010101011 |
| 0 | 1 | 1101010100 |
| 1 | 0 | 0010101010 |
| 1 | 1 | 1101010101 |

FIG. 8A

| Preamble | LSB | 24-Bit Audio Sample Word | MSB | V | U | C | P |
|---|---|---|---|---|---|---|---|
| 0　　3 | 4 | | 27 | 28 | | | 31 |

FIG. 8B

| Preamble | Auxiliary Data | LSB | 20-Bit Audio Sample Word | MSB | V | U | C | P |
|---|---|---|---|---|---|---|---|---|
| 0　　3 | 4　　7 | 8 | | 27 | 28 | | | 31 |

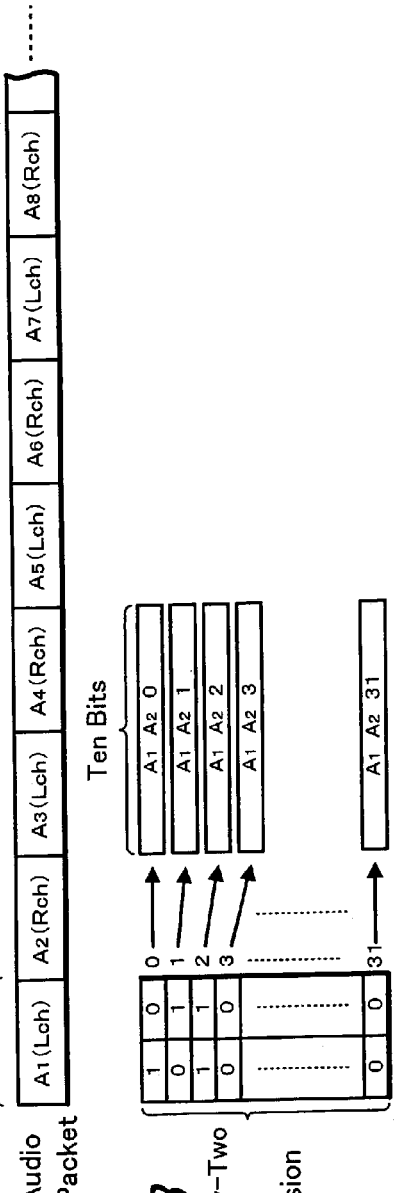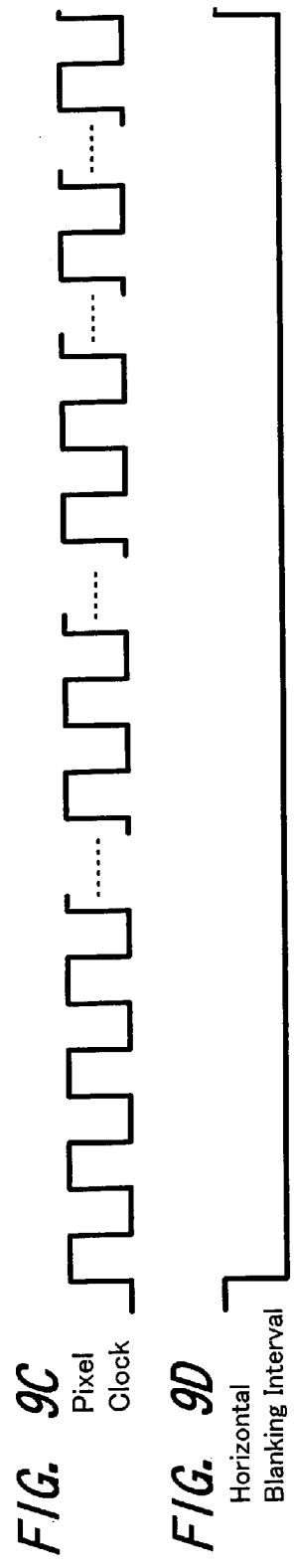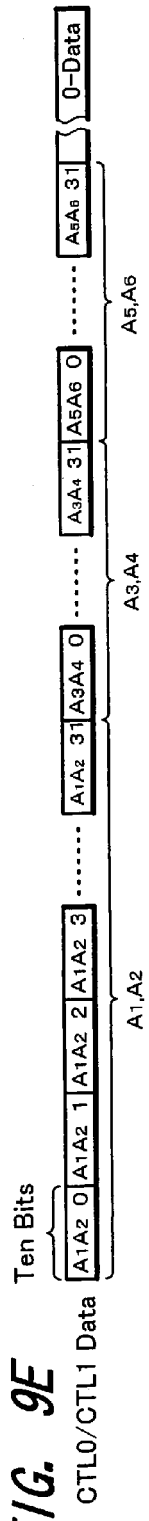
FIG. 9A One Subframe (Thirty-Two Bits) Audio Packet
FIG. 9B Thirty-Two Bits Conversion Data
FIG. 9C Pixel Clock
FIG. 9D Horizontal Blanking Interval
FIG. 9E CTL0/CTL1 Data Horizontal Blanking Interval Example of Six-Subframe Arrangement Example of Eight-Subframe Arrangement

TRANSMISSION METHOD OF DIGITAL AUDIO DATA WITH VIDEO DATA

TECHNICAL FIELD

The present invention generally relates to a transmission method, a transmission system, a sending device, and a receiving device, preferably applied to a case where a video-signal source and an image display device are connected, using a DVI (Digital Visual Interface), for example, and more particularly, to a technology for transmitting video data and audio data by time division multiplexing.

BACKGROUND ART

Recently, there has been a standard called a DVI in which video data are transmitted to a display device as digital data, when a video-signal source such as a television tuner, a video reproducing device, and a main unit of a personal computer, and an image display device such as a monitor receiving unit are connected.

Though the details of the DVI standard will be described later in an embodiment, the standard will be briefly described as follows. Video data are transmitted to a display device as data in which each of primary color signals R, G, B are digitalized in pixels, thereby high-quality picture being transmitted and displayed. Moreover, since the video data are pixel-unit data, a display driver on a display device side may be directly driven by the received video data to enable displaying and so on by a comparatively simple configuration for the processing.

However, basically only video data are transmitted through a cable defined by the DVI standard, and it is required to connect a tuner and so on to an audio output device using an audio cable different from the cable defined by the DVI standard, considering a case where audio data are simultaneously transmitted with video data. Therefore, there has been a problem that a connection configuration becomes complex when a plurality of cables are connected as described above.

Specifically, considering a system configuration in which only video data are transmitted, as shown in FIG. 1, for example, the video data encoded according to the DVI standard may be transmitted from a video-signal source 1 to a display device 3 by connecting them using a cable 2 of the DVI standard. On the other hand, as shown in FIG. 2, for example, when video data and audio data are transmitted from a video/audio signal source 4 to a display device 6 including a speaker, it is required that the video data are transmitted through the cable 2 according to the DVI standard, and, furthermore, the audio data are transmitted through an audio signal cable 5 different from the cable 2. According to a connection shown in FIG. 2, the image output from the video/audio signal source 4 may be displayed on the display device 6, and sounds may be output from speakers 6L, 6R installed in the display device 6.

However, when it is configured as shown in FIG. 2 in which different cables for the video data and the audio data are respectively used to connect, there has been a problem that a connection configuration becomes more complex. The number of cables to connect devices is preferably small.

A data transmission technology using a bus line according to an IEEE (The Institute of Electrical and Electronics Engineers) 1394 standard, for example, may be applied to a technology for transmitting video data and audio data using one cable after multiplexing both the data. However, highly complex data processing is required for data transmission using the bus line according to the above IEEE1394 standard or the like, and therefore, extremely large-scale circuit configuration is required to perform encoding processing for transmission on a sending side, and to perform decoding processing of the data received through the bus line on a receiving side; and the cost may increase. Moreover, in the IEEE1394 standard or the like, video data and audio data are compressed and encoded to multiplex them in view of a transmission rate and so on. Therefore, there has been a disadvantage that the quality of picture may be degraded compared with that in the above described DVI standard in which the video data are digitalized in pixels to be transmitted.

Moreover, when digitalized audio data are transmitted, error-correction processing which is different from the processing necessary for transmitting video data is required. As a result, there has been a problem that a configuration for processing audio data becomes complex both on the sending and receiving sides when particular processing is performed for the error correction.

DISCLOSURE OF INVENTION

Considering the above described problems, the object of the present invention is to multiplex audio data onto video data to favorably transmit the multiplexed data in a simple configuration.

The first aspect of the present invention is a data transmission method comprising the steps of: dividing digital audio data having a predetermined packet structure into units including a predetermined number of bits; converting each unit of the divided digital audio data into specific data to be encoded; arranging the encoded data in blanking intervals of video data; and transmitting the digital audio data as well as the video data using a transmission line for the video data.

According to this aspect, audio data are multiplexed onto video data utilizing blanking intervals of the video data, and the video data and the audio data are simultaneously transmitted adopting an existing video-data transmission format such as the DVI standard. As a result, the digital audio data are favorably transmitted using a transmission line for the video data, while the existing configuration for transmitting video data is used without alterations.

The second aspect of the present invention is that in the data transmission method according to the first aspect of the invention, the digital audio data having the packet structure include a parity code for audio data.

According to this aspect, error detection of the transmitted audio data can be performed by using the parity code on a receiving side.

The third aspect of the present invention is that in the data transmission method according to the second aspect of the invention, data at a position where an error has been detected on decoding the encoded data are restored with operation using the parity code to correct the error, when the digital audio data transmitted on the transmission line is received.

According to this aspect, error correction of the audio data may be realized by simple processing.

The fourth aspect of the present invention is a data transmission system for transmitting video data and digital audio data from a data sending device to a data receiving device, the data sending device in the data transmission system comprising: data division means for dividing digital audio data having a predetermined packet structure into units including a predetermined number of bits; encoding means for converting each unit of the digital audio data divided by the data division means into specific data to be encoded; and data transmission means for transmitting the data to a predetermined transmission line, after the data encoded by the encoding means are arranged in blanking intervals of the video data to be synthesized, and the data receiving device in the data transmission system comprising: separation means for separating the data arranged in the blanking intervals of the video data which are received through the transmission line; decoding means for decoding the encoded data separated by the separation means; and data assembly means for assembling the data decoded by the decoding means into the data with the original packet structure.

According to this aspect, there may be obtained a transmission system in which audio data are multiplexed onto video data utilizing blanking intervals of the video data, and the video data and the audio data are simultaneously transmitted adopting an existing video-data transmission format such as the DVI standard. As a result, the digital audio data are favorably transmitted using a transmission line for the video data, while an existing configuration for transmitting video data is used without alterations.

The fifth aspect of the present invention is that in a data transmission system according to the fourth aspect of the invention, digital audio data having a packet structure, which are divided by the data dividing means of the data sending device, include a parity code for audio data, and the parity code is also transmitted to the data receiving device through the transmission line.

According to this aspect, there may be obtained a transmission system in which error detection of the audio data transmitted using the parity code may be performed at a receiving device.

The sixth aspect of the present invention is that in a data transmission system according to the fifth aspect of the invention, data at a position where an error is detected by the decoding means of the data receiving device are restored into the original data by the operation using the parity code to correct the error.

According to this aspect, there may be obtained a transmission system in which error correction of the audio data may be realized by simple processing.

The seventh aspect of the present invention is that in a data sending device for sending video data and digital audio data, the data sending device comprises: data division means for dividing the digital audio data having a predetermined packet structure into units including a predetermined number of bits; encoding means for converting each unit of the digital audio data divided by the data division means into specific data to be encoded; and data transmission means for transmitting the data to a predetermined transmission line, in which the data encoded by the encoding means are arranged in blanking intervals of the video data to be synthesized.

According to this aspect, the digital audio data are favorably transmitted using a transmission line for transmitting the video data, while an existing configuration for transmitting video data is used without alterations.

The eighth aspect of the present invention is that in the data sending device according to the seventh invention, the digital audio data having the packet structure, which are divided by the data dividing means, include a parity code for audio data, and the parity code is also transmitted from the data sending device to the transmission line.

According to this aspect, error detection of the audio data transmitted from the sending device may be realized on the data receiving side using the parity code.

The ninth aspect of the present invention is that in a data receiving device for receiving video data and digital audio data, the receiving device comprises: separation means for separating data, which are arranged in blanking intervals of the video data, received through a predetermined transmission line; decoding means for decoding the predetermined encoded data separated by the separation means; and data assembly means for assembling the data decoded by the decoding means into the data with the original packet structure.

According to this aspect, the digital audio data are favorably transmitted using a transmission line for transmitting the video data, while an existing configuration for transmitting video data is used without alterations.

The tenth aspect of the present invention is that in the data receiving device according to the ninth aspect of the invention, the data received through the transmission line include a parity code for audio data to be transmitted; and the data at a position where an error is detected by the decoding means are restored into the original data by operation using the parity code to correct the error.

According to this aspect, error detection of the received audio data using the parity code can be realized, and it enables audio reproduction without an error.

BRIEF DESCRIPTION OF DRAWINGS

FIG. 7 is an explanatory chart showing an example of CTL0 data (C0 data) and CTL1 data (C1 data) according to the DVI method corresponding to a CTL code;

FIGS. 8A and 8B are explanatory views showing examples of audio data having a packet structure (examples of one sub-frame structure according to the IEC 60958 format);

FIGS. 9A to 9E are explanatory views showing an example for transmission processing of audio packets according to the embodiment of the present invention;

BEST MODE FOR CARRYING OUT THE INVENTION

Hereinafter, referring to FIGS. 3 to 11, an embodiment of the present invention will be described.

In this embodiment, the invention is applied to a system in which video data output from a video/audio signal source such as a videotape recording/reproducing device, a video disk reproducing device, and a tuner are transmitted to a display device such as a monitor receiving unit and a television receiver. In this configuration, a device having an audio outputting function is used as the display device, and video data and audio data are transmitted from a video/audio signal source using one cable. The cable of DVI (Digital Visual Interface) standard is used to transmit the data.

Figure 3:
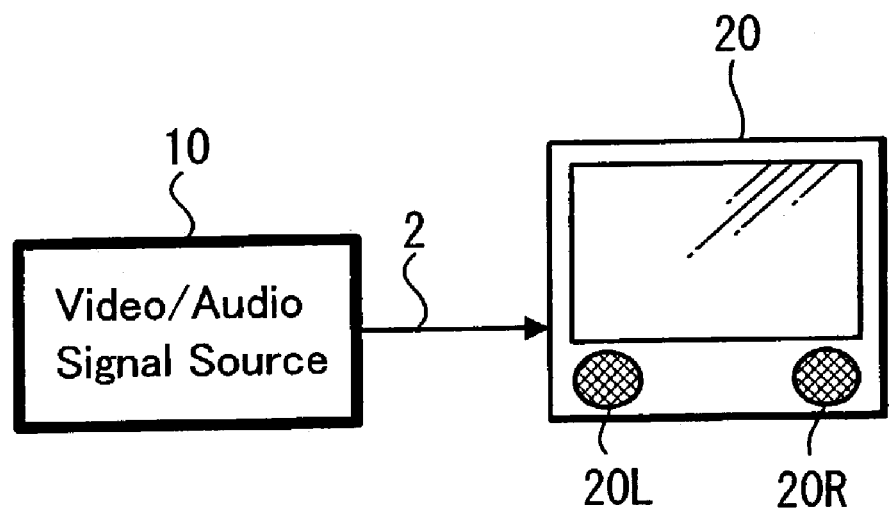
FIG. 3 is a block diagram showing a system configuration according to an embodiment of the present invention.

FIG. 3 is a view showing a general configuration of a transmission system according to this embodiment. It is configured that a video/audio signal source 10 is connected to a display device 20 including a speaker, using a DVI cable 2 by which video data and audio data are transmitted. Connector units of the video/audio signal source 10 and the display device 20, to which the DVI cable 2 is connected, are constituted to have, for example, a 24-pin connector respectively, and twenty-four pins of each connector of the device 10 and device 20 are individually connected through the cable 2.

Figure 4:
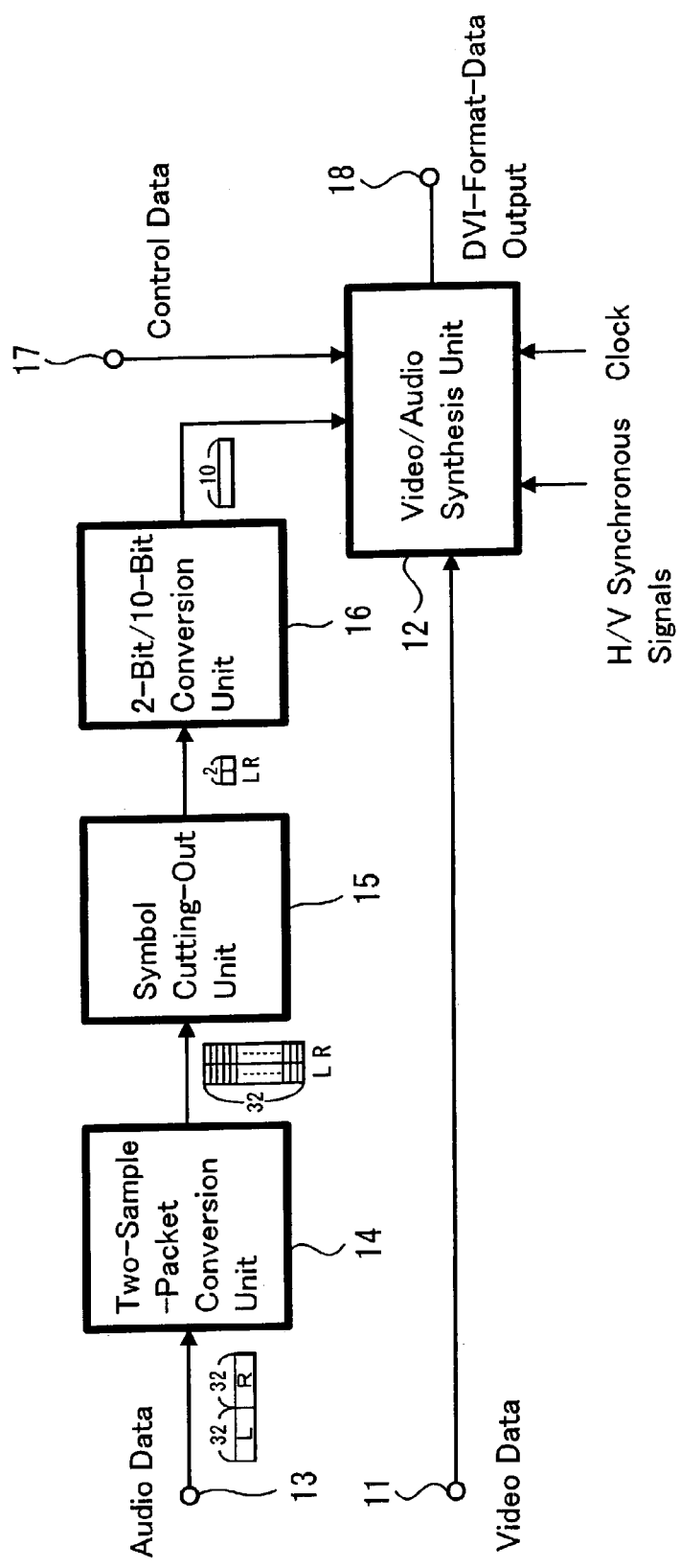
FIG. 4 is a block diagram showing an example of sending system configuration according to the embodiment of the present invention.

FIG. 4 shows a configuration for processing in which the video/audio signal source 10 functions as a sending device by which video data and audio data are transmitted to the DVI standard cable. The video data encoded according to the DVI standard are supplied from a video processing unit (not shown) of the device 10 to a video-data input unit 11. The video data obtained in the video-data input unit 11 are supplied to an video/audio synthesis unit 12; synthesis processing by which the audio data are multiplexed on the video data is performed in the synthesis unit 12; and the synthesized data are supplied to a DVI-format-data output unit 18, from which the data are transmitted to the DVI cable connected to the device 10.

Referring to FIGS. 6A to 6E, a configuration in which video data are transmitted according to the DVI format will be described. As video data to be transmitted, B data (blue data) shown in FIG. 6A, G data (green data) shown in FIG. 6B, and R data (red data) shown in FIG. 6C are transmitted as data on individual channels. The data on each channel are assumed to be data in which eight bits are used to represent each pixel, and data of three channels become data of twenty-four bits in total for one pixel. However, when pixel data are actually transmitted according to the DVI standard, it is configured that 8-bit data are converted into 10-bit data for transmission. The pixel data of each channel are transmitted in synchronization with a pixel clock shown in FIG. 6D. FIG. 6E is a view showing details of bit data on each channel, and 10-bit pixel data [0, 1, 2 . . . 9] on each channel are transmitted in synchronization with the pixel clock.

According to the DVI format, the pixel data on each channel are not transmitted during horizontal blanking intervals and vertical blanking intervals. With regard to the transmission channel of the B data shown in FIG. 6A, data defined as a horizontal synchronization signal HSYNC are transmitted during the horizontal blanking intervals, and data defined as a vertical synchronization signal VSYNC are transmitted during the vertical blanking intervals. With regard to the transmission channel of the G data shown in FIG. 6B, two control data (CTL0 data and CTL1 data) are arranged in each blanking interval. With regard to the transmission channel of the R data shown in FIG. 6C, two control data (CTL2 data and CTL3 data) are arranged in each blanking interval. Hereinafter, in the following description, control data CTL0, CTL1, CTL2, and CTL3 are represented as control data C0, C1, C2, and C3, respectively.

Figure 1:
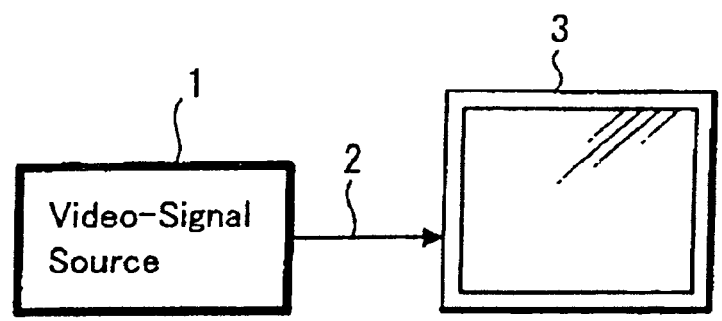
FIG. 1 is a block diagram showing a connection example according to a conventional DVI standard.
Figure 2:
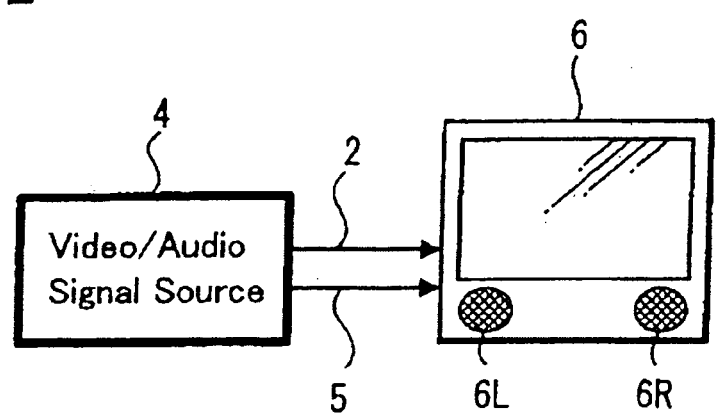
FIG. 2 is a block diagram showing another connection example (in which an audio cable is additionally provided) according to the conventional DVI standard.

Respective control data C0, C1, C2, and C3, which are 2-bit data, are converted into 10-bit data to be arranged in the blanking intervals of respective channels. For example, with regard to the G data channel shown in FIG. 6B, 2-bit data of 1-bit control data C0 and 1-bit control data C1 are obtained; the 2-bit data are converted into 10-bit data with a specific pattern; and the converted 10-bit data are arranged in the blanking intervals. Specifically, as shown in FIG. 7, there are four kinds of combinations [0 0], [0 1], [1 0], and [1 1] as the combination of 2-bit data including the control data C0, C1, and 10-bit CTL code is assigned to each combination as shown in FIG. 7. Therefore, data other than the four kinds of 10-bit data are not transmitted on the G data channel during the blanking intervals. The control data C2, C3 transmitted on the R data channel are similarly processed.

In this embodiment, it is configured that audio data are transmitted using the control data C0, C1 arranged in the horizontal blanking intervals on the G data transmission channel shown in FIG. 6B. The configuration for transmitting the audio data will be described, returning to description of FIG. 4.

Audio data in the audio data input unit 13, which is obtained from an audio processing unit (not shown) of the device 10, are supplied to the video/audio synthesis unit 12 through data conversion processing. In this embodiment, the audio data obtained in the audio data input unit 13 are the audio data made into packets according to an IEC (International Electrotechnical Commission) 60958 method.

With regard to the packet data according to the IEC 60958 method, one packet (one subframe) comprises thirty-two bits; a preamble is arranged in the first four bits; and one sample of audio data (audio sample word) is arranged in the subsequent 24-bit segment, as shown in FIG. 8A. In some cases, data with the number of bits being less than twenty-four (for example, sixteen bits) are arranged as one sample. Further, a sub-code is arranged in the last four bits.

As shown in FIG. 8A, a parity bit V, a user data bit U, a channel status bit C, and a parity bit P are arranged as the sub-code in one packet. The parity bit P of one bit is a code for executing parity check on the audio data, and it may be judged whether there is an error in the packet of the audio data by the parity check through operation using the parity code. However, only the presence of the error is judged by the data of the parity bit P, and the error may not be corrected.

Further, in some cases, a 4-bit segment following the 4-bit preamble is assumed to be an auxiliary data segment, and the segment in which the audio sample word is arranged is set to twenty bits, as shown in FIG. 8B.

When the audio data are 2-channel data comprised of a left channel data and a right channel data, one frame comprises two packets in total, that is, one packet of the audio data for a left channel, and one packet of the audio data for a right channel, and data of sixty-four bits of two packets are transmitted as one unit.

Returning to the description of FIG. 4, in a two-sample-packet conversion unit 14, the audio data having the packet structure obtained in the audio data input unit 13 are constituted to be made into a data array in which thirty-two 2-bit data each comprised of one bit from each of the arranged two packets are obtained, as the audio data of sixty-four bits for two packets (one frame) being one unit, and then the thirty-two 2-bit data are supplied to a symbol cutting-out unit 15.

In the symbol cutting-out unit 15, the supplied thirty-two 2-bit data are sequentially cut-out one by one (that is, every two bits) to be output. The 2-bit data cut-out in the symbol cutting-out unit 15 are supplied to a 2-bit/10-bit conversion unit 16. Conversion processing into the 10-bit data in the conversion unit 16 is performed in a similar manner to the conversion processing of the 2-bit data of C0 and C1 into the 10-bit data, as described in FIG. 7. Specifically, the 2-bit data are converted into any one of four kinds of the CTL code shown in FIG. 7.

The converted 10-bit data are supplied to the video/audio synthesis unit 12, in which the audio data are multiplexed onto the video data by arranging the 10-bit data in the horizontal blanking intervals on the G data channel. As a result, the audio data are transmitted as the control data C0, C1 which are transmitted during the horizontal blanking intervals on the G data channel. The details of data processing in actual practice will be later described in the description on operations. The audio data of eight subframes (four frames) at the maximum may be transmitted during one horizontal blanking interval in this embodiment.

The control data supplied from a control-data input unit 17 to the video/audio synthesis unit 12 are converted into 10-bit data as the control data C2 and C3 to be arranged in the horizontal blanking intervals on the R data channel. Further, data necessary for output according to the DVI format, such as the horizontal and the vertical synchronization signals and a pixel clock, are supplied to the video/audio synthesis unit 12.

Figure 5:
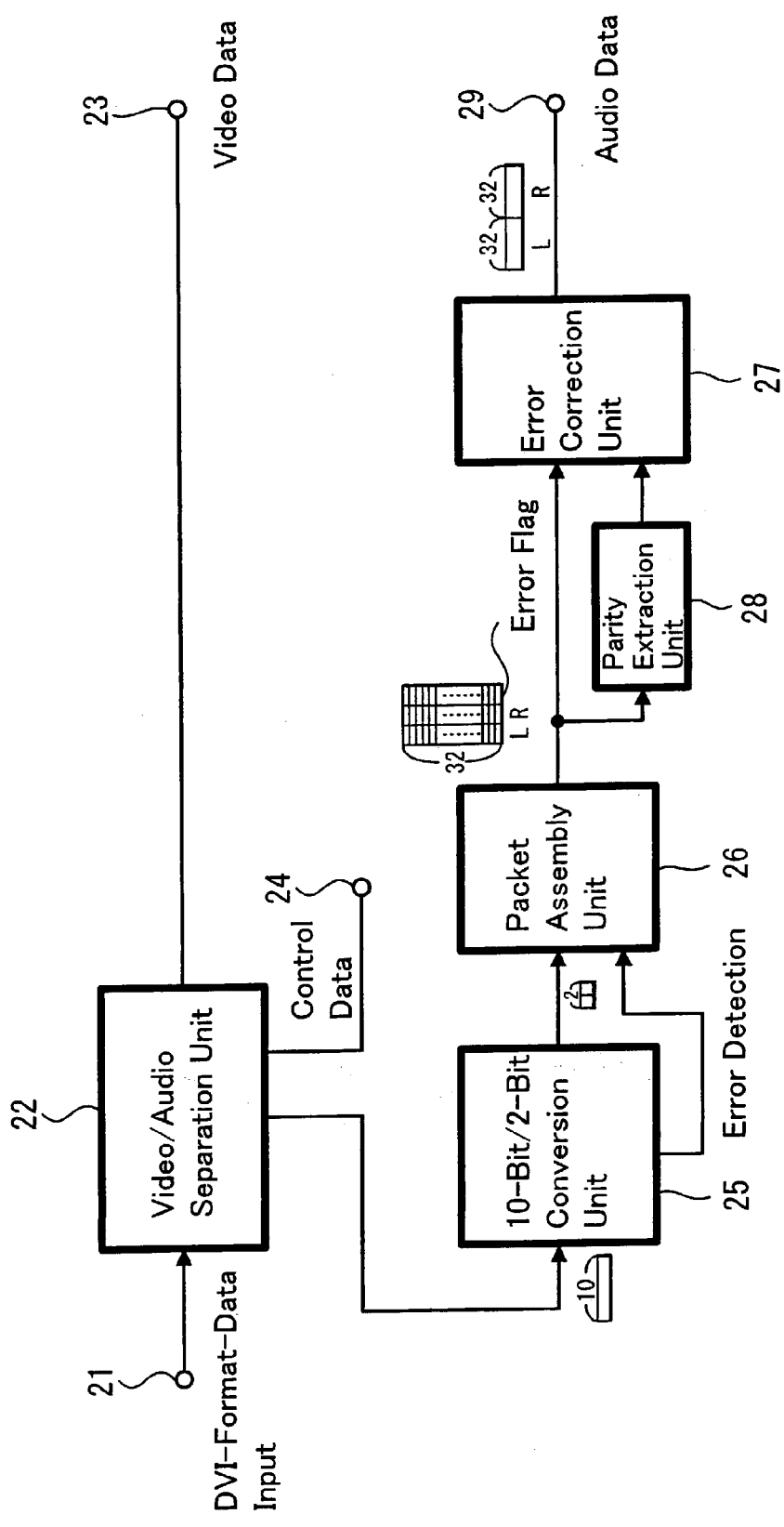
FIG. 5 is a block diagram showing an example of receiving system configuration according to the embodiment of the present invention.
Figure 6:
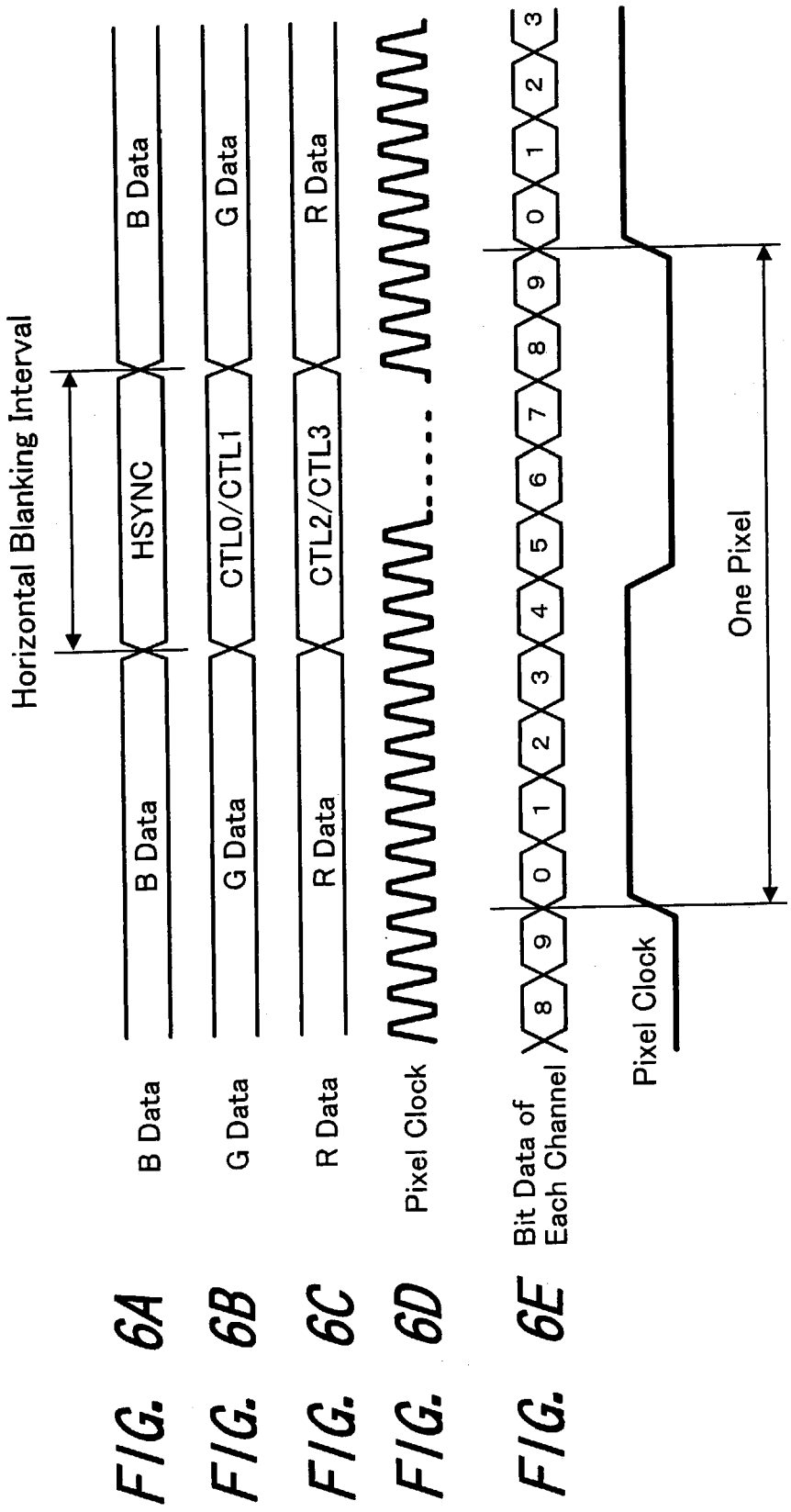
FIGS. 6A to 6E are timing charts showing transmission timing according to the DVI standard.

FIG. 5 shows a configuration for the processing in which the display device 20 functions as a device receiving the video data and the audio data transmitted through the DVI cable. The data transmitted through the DVI cable connected to the device 10 are obtained in a DVI format data input unit 21. The data obtained in the input unit 21 are supplied to a video/audio separation unit 22, in which each of the data (audio data and control data) arranged in the blanking intervals is separated from the video data. The video data from which the above described data have been separated in the video/audio separation unit 22 are supplied through a video data output unit 23 to a video processing unit (not shown) in the display device 20 to be processed for display. Further, the control data (control data C2, C3 multiplexed on the blanking intervals of the R data channel) separated in the video/audio separation unit 22 are supplied to a controller (not shown) of the display device 20 through a control data output unit 24.

The audio data (data transmitted as the control data C0, C1) which have been separated from the horizontal blanking intervals on the G data channel in the video/audio separation unit 22 are supplied to a 10-bit/2-bit conversion unit 25. In the 10-bit/2-bit conversion unit 25, decoding processing by which the 10-bit CTL code shown in FIG. 7 are converted into the 2-bit data C0, C1 is performed. However, when there are detected data other than the four kinds of 10-bit data shown in FIG. 7, it is judged that: a transmission error has occurred; error detection data are output; and 2-bit data corresponding to the error detection data are considered to be missing data which are defined to be neither 0-data nor 1-data.

The 2-bit unit data converted in the 10-bit/2-bit conversion unit 25 are supplied to a packet assembly unit 26, in which thirty-two supplied 2-bit data are collected to be processed for assembling two packets (two subframes: one frame). Further, it is configured that the error detection data output from the 10-bit/2-bit conversion unit 25 are supplied to the packet assembly unit 26, and an error flag based on the error detection data is set to each bit of the packets assembled in the packet assembly unit 26. The data at a bit position to which the error flag has been set are missing data.

The packet data assembled in the packet assembly unit 26 are supplied to an error correction unit 27 and a parity extraction unit 28. In the parity extraction unit 28, a parity bit in the supplied packet data is extracted, and the extracted parity bit is supplied to the error correction unit 27. When there are missing data in the supplied packet data, error-correction processing in which the missing data are determined based on the operation according to parity check using the parity bit is performed in the error correction unit 27. Since the parity bit comprises one bit per one packet in this embodiment, it is possible to restore missing data up to one bit per one packet. However, when there are missing data of two or more bits per one packet, the error may not be corrected by the operation using the parity check.

In the error correction unit 27, subsequently, the two-subframe-unit packet data on which the error-correction processing has been performed are supplied through an audio data output unit 29 to an audio processing unit (not shown) in the display device 20 to be processed and output from speakers 20L and 20R shown in FIG. 3.

Hereinafter, the state in which audio data are transmitted by a system according to this embodiment will be described in detail. FIGS. 9A to 9E are views showing a state in which audio data packets according to the IEC 60958 standard are arranged in the horizontal blanking intervals on the sending side (the video/audio signal source 10 in this embodiment). As shown in FIG. 9A, the audio data packet according to the standard has a constitution in which one subframe corresponding to one packet includes thirty-two bits, and a packet of the left channel (Lch) and a packet of the right channel (Rch) are alternately arranged to be supplied. In the example of FIG. 9A, packets $A_1, A_3, A_5 \ldots$ with a subscript of an odd number are subframes for the left channel, and packets $A_2, A_4, A_6 \ldots$ with a subscript of an even number are subframes for the right channel.

As shown in FIG. 9B, in the two-sample-packet conversion unit 14, data of two packets (packets $A_1, A_2$ here) are placed in the array with data at the same bit position in each packet arranged as rows, and in the symbol cutting-out unit 15, 2-bit data comprising the data at the same bit position in each packet are sequentially fetched. Further, as shown on the right side of FIG. 9B, each of the 2-bit data is converted into the 10-bit CTL code shown in FIG. 7.

As shown in FIG. 9B, it is assumed that data from the zero bit to the thirty-first bit of the packets $A_1$ and $A_2$ are converted into the 10-bit data $[A_1, A_2\ 0], [A_1, A_2\ 1], [A_1, A_2\ 2], \ldots [A_1, A_2\ 31]$ at every bit position.

The 10-bit data obtained as described above are arranged in the horizontal blanking interval shown by a horizontal synchronization signal of FIG. 9D on a specific channel (G data channel in this embodiment) of the video data in synchronization with the pixel clock shown in FIG. 9C. FIG. 9E shows a state in the horizontal blanking interval of the channel in which the audio data are arranged as the control data C0, C1. In this embodiment, the above-described 10-bit data $[A_1, A_2\ 0], [A_1, A_2\ 1], [A_1, A_2\ 2] \ldots [A_1\ A_2\ 31]$ are sequentially output, being synchronous with the pixel clock. After the last data $[A_1, A_2\ 31]$ of the packets $A_1, A_2$ are sent out, 10-bit data $[A_3, A_4, 0]$ to $[A_3, A_4\ 31]$ of the next two packets $A_3, A_4$ are sequentially output, being synchronous with the pixel clock.

Accordingly, audio data in each packet are sequentially transmitted in the horizontal blanking interval. In this embodiment, there are two cases: one case in which audio data comprising six packets (six subframes, in a word, three frames) are arranged in one horizontal blanking interval, and the other case in which audio data comprising eight packets (eight subframes, in a word, four frames) are arranged in one horizontal blanking interval, and FIG. 9E is an example in which the audio data comprising six packets are arranged. After the audio data of six packets have been already sent out, the 0-data (that is, 10-bit data comprising C0 and C1 both of which are 0) are continuously arranged in the remaining time of the horizontal blanking interval.

Figure 10A:
FIGS. 10A to 10C are explanatory views showing an example of arranging a subframe according to the embodiment of the present invention.
Figure 10B:
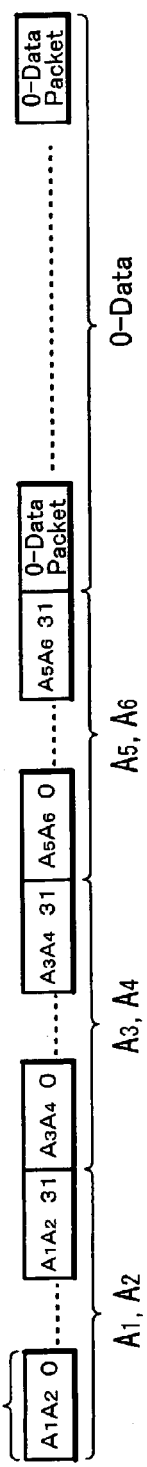
Figure 10C:
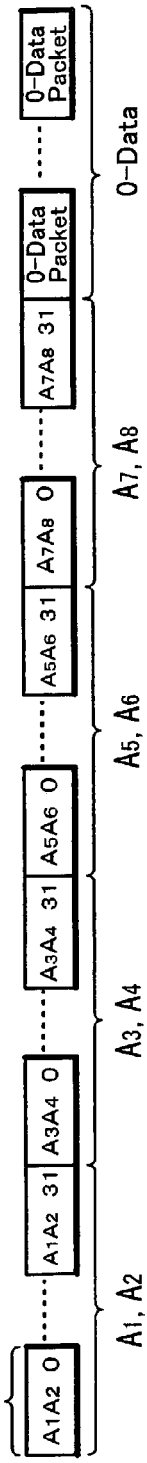

FIG. 10 shows the example of six subframes (three frames) being arranged (FIG. 10B) in one horizontal blanking interval shown by the horizontal synchronization signal of FIG. 10A, and the example of eight subframes (four frames) are arranged (FIG. 10C) in one horizontal blanking interval of FIG. 10A. When compared FIG. 10B with FIG. 10C, there is a difference in length of the last 0-data segment between the first example in which six subframes are arranged in one horizontal blanking interval, and the second example in which eight subframes are arranged in one horizontal blanking interval. In actual transmission states, a horizontal blanking interval in which six subframes are arranged and a horizontal blanking interval in which eight subframes are arranged, are periodically set in a predetermined order.

For example, when it is assumed that the horizontal frequency of the video data is 15.75 kHz and the sample frequency of the audio data is 48 kHz, one horizontal scanning time of the video data is about 63.5 microseconds and one sampling time of the audio data is about 20.8 microseconds. Therefore, the two pieces of processing are combined such that the processing by which the audio data of four frames (four samples per one channel: eight subframes in total) are sent in one horizontal line is executed once in tens of times, when processing by which the audio data of three frames (three samples per one channel: six subframes in total) are sent in one horizontal line is executed, thereby the audio being transmitted as well as the video without delay.

Figure 11:
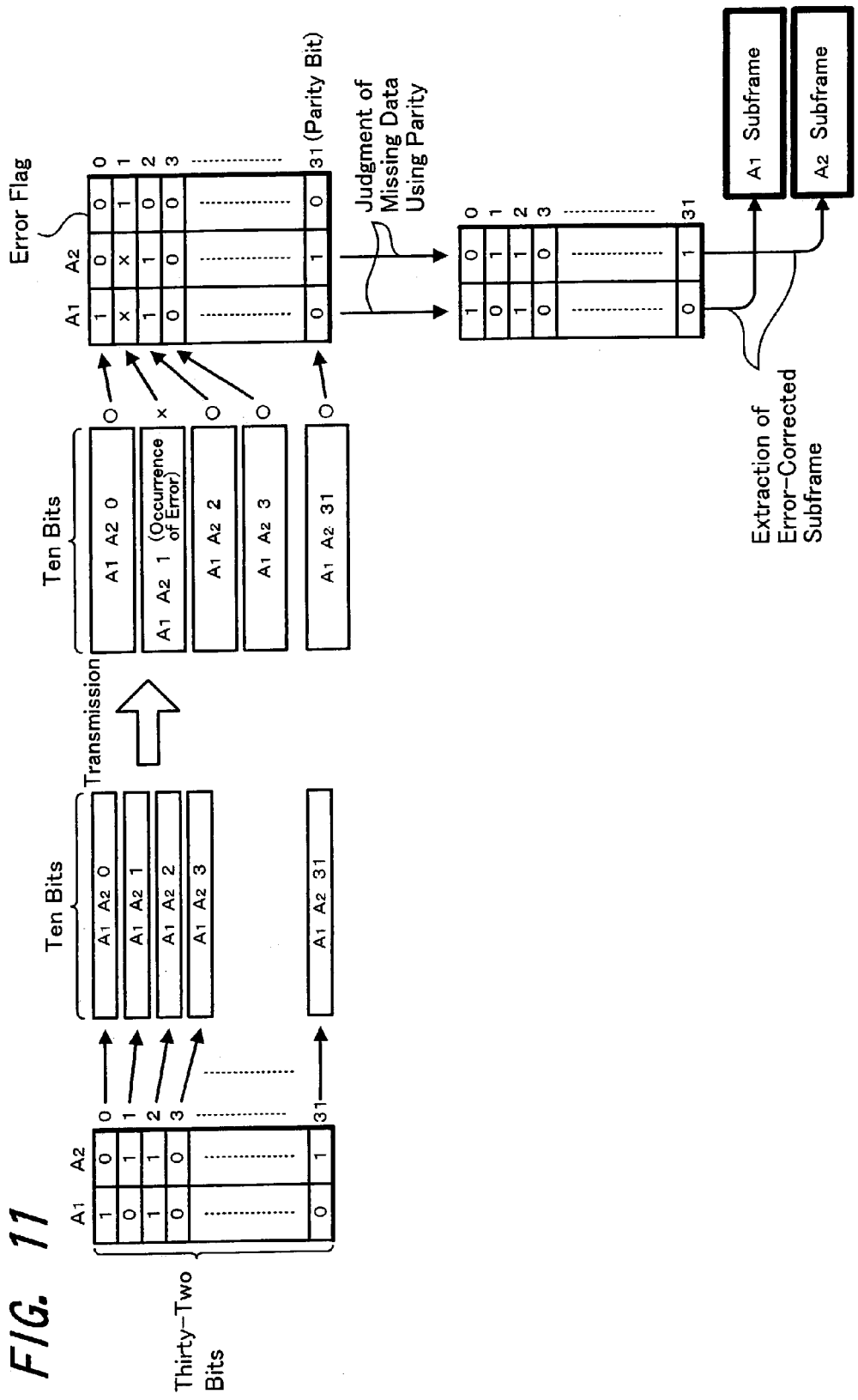
FIG. 11 is an explanatory view showing an example of error-correction processing according to the embodiment of the present invention.

Referring to FIG. 11, there will be described a state in which error correction is performed on the receiving side of the audio data transmitted in the horizontal blanking intervals as described above. FIG. 11 shows an example in which two subframes $A_1, A_2$ are transmitted. Specifically, as shown in the left end of FIG. 11, after subframes $A_1, A_2$ both of which respectively comprise 32 bits are converted into 10-bit data $[A_1, A_2\ 0], [A_1, A_2\ 1], [A_1, A_2\ 2] \ldots [A_1, A_2\ 31]$ by every 2-bit data at each bit position, the converted 10-bit data are sequentially transmitted, using the DVI cable during the horizontal blanking interval.

When transmission is performed as described above, it is assumed that 10-bit data may not be decoded into original 2-bit data, since a transmission error has occurred in the 10-bit data $[A_1, A_2\ 1]$, for example, as shown in FIG. 11. It is also assumed that the other 10-bit data may be normally decoded into the 2-bit data after properly received. At this time, the bits of the subframes $A_1, A_2$ in which a transmission error has occurred become missing data (bit data represented by X shown in the figure), and a corresponding error flag at the bit position is set to 1-data (error flags at bit positions without an error are set to 0-data) in the packet assembly unit 26.

Then, when there are missing data as described above, the missing data are restored by operation processing in the error correction unit 27. Specifically, the missing data is judged by separately performing the operation using a parity bit on each of the subframes $A_1, A_2$. Various kinds of known methods which have been used for encoding digital data may be applied to a method for setting the parity bit. For example, setting a parity bit so that all of the thirty-two bits in one subframe, to which the parity bit is respectively added, become even number as a result, it is possible to judge whether the missing data are 1-data or 0-data by adding thirty-one bits other than the missing data. Consequently, after error correction of a subframe is performed in the error correction unit 27, the corrected subframe may be obtained in the audio data output unit 29.

Since transmission under multiplexing audio data onto video data is realized as described above, the audio data may be easily and favorably transmitted using the configuration for transmitting the video data. Specifically, using a system for transmitting existing digital video data according to the DVI standard enables transmission of the audio data as well as the video data on the same signal cable. Especially, in this embodiment, since the audio data are configured to be transmitted in horizontal blanking intervals of the video data, there is no need to change the conventional DVI standard with respect to the configuration for the processing of transmitting the video data, and processing blocks prepared for the DVI standard of the video data may be used at both of the sending and receiving sides without any alterations.

Further, in this embodiment, since packet data according to the IEC 60958 method, which has been widely used as a data transmission standard for transmitting digital audio data, are transmitted as the audio data without alterations, error correction using a parity bit which has been previously prepared in the packet according to the above method is performed to realize favorable transmission with less errors, when there is a transmission error in the packet data according to the above described method.

Specifically, when audio packets according to the IEC 60958 method are transmitted without alterations, it may only be determined whether there is an error in the data of the corresponding packet by operation using the parity bit in the packet. Therefore, the parity bit has not been used for processing at the receiving side so far. However, in this embodiment, since the data are converted into the 10-bit CTL code by every two bits to be transmitted after the data in the packet are decomposed into units including bits, the bit position in which an error has occurred is determined when an error occurs in data of the packet. Accordingly, error correction may be easily performed using the parity bit without additionally preparing another code for the error correction.

Although digital audio data of two channels are configured to be transmitted in the above-described embodiment, the present invention may also be applied to a case where digital audio data of one channel are transmitted, or to a case in which digital audio data of three or more channels are transmitted. For example, when multichannel data of three or more channels are transmitted, the CTL2 and CTL3 portions of horizontal blanking intervals on the R data channel shown in FIG. 6 may be used for transmitting the audio data.

Further, in the above-described embodiment, though packets in which digital audio data at a certain sample rate are arranged are transmitted, packets in which digital audio data compressed to be encoded according to a predetermined method (such as the ATRAC method and the MP3 method) are arranged may be transmitted.

Furthermore, in the above-described embodiment, though horizontal blanking intervals are used as the periods for transmitting the audio data, vertical blanking intervals may be used for transmitting the audio data.

In addition, though it is configured in the above-described embodiment that the audio data is multiplexed onto the video data to be transmitted using a transmission line according to the DVI standard, other standards for transmitting the video data may be applied. A wireless transmission, as well as a transmission line by wire connection, may be used in those cases.

INDUSTRIAL APPLICABILITY

According to the present invention, audio data are multiplexed onto video data using blanking intervals of the video data, to simultaneously transmit the audio data as well as the video data using a transmission line for transmitting the video data by adopting an existing video-data transmission format such as the DVI standard, and as a result, the digital audio data are favorably transmitted, while an existing configuration for transmitting video data is used without any alterations.

Accordingly, the digital audio data having a packet structure include the parity code for the audio data, thereby enabling the receiving side to perform error detection of audio data which are transmitted, using the parity code.

Furthermore, with the configuration in which the parity code is transmitted as described above, when the digital audio data transmitted on the transmission line are received, data at a position where an error is detected on decoding of the encoded data are restored to correct the error by operation using the parity code. As a result, error correction of the audio data may be performed by simple processing.

The invention claimed is:

1. A data transmission method for transmitting image data using first, second and third channels; synchronizing signal data is provided in a blanking period of the first channel and control information is provided in the blanking period of the second and/or third channels; the method comprising the steps of:
   combining a plurality of packets of digital audio data, wherein each packet of digital audio data has a parity code;
   constituting a data unit by dividing each packet by a predetermined number of bit;
   encoding each data unit by conversion into one of plural predefined kinds of specific data; and
   transmitting the encoded data unit by replacing said control information in the blanking period of the second and/or third channel with the encoded data unit.

2. The data transmission method according to claim 1, wherein the constituting step divides each packet by one bit from a same bit-position in each packet.

3. The data transmission method according to claim 1, wherein the number of packets transmitted in one blanking period is switched between a first number and a second number.

4. The data transmission method according to claim 1, wherein at least one packet of digital audio data is transmitted in the blanking period.

5. The data transmission method according to claim 1, wherein a remainder of the blanking period following the encoded data units produced from the packets of digital audio data is filled with zero data.

6. The data transmission method according to claim 1, wherein said digital audio data is compressed according to a predetermined method.

7. A data transmission apparatus for transmitting image data using first, second and third channels; synchronizing signal data is provided in a blanking period of the first channel and control information is provided in the blanking period of the second and/or third channels; the apparatus comprising:
   data dividing means for combining a plurality of packets of digital audio data and constituting a data unit by dividing each packet by a predetermined number of bit, wherein each packet of digital audio data has a parity code;
   encoding means for encoding each data unit by conversion into one of plural predefined kinds of specific data; and
   data transmission means for combining and replacing said control information in the blanking period of the image data of the second and/or third channel with said encoded data unit and for transmitting the combined data.

8. The data transmission apparatus according to claim 7, wherein the data dividing means divides each packet by one bit from a same bit-position in each packet.

9. The data transmission apparatus according to claim 7, wherein the number of packets transmitted in one blanking period is switched between a first number and a second number.

10. The data transmission apparatus according to claim 7, wherein at least one packet of digital audio data is transmitted in the blanking period.

11. The data transmission apparatus according to claim 7, wherein a remainder of the blanking period following the encoded data units produced from the packets of digital audio data is filled with zero data.

12. The data transmission apparatus according to claim 7, wherein said digital audio data is compressed according to a predetermined method.

13. A data transmission apparatus for transmitting image data using first, second and third channels; synchronizing signal data is provided in a blanking period of the first channel and control information is provided in the blanking period of the second and/or third channels; the apparatus comprising:
   combining unit combining a plurality of digital audio data unit, wherein each digital audio data unit includes a parity code;
   data unit forming unit extracting a predetermined length of data from each of said combined digital audio data units and forming a data unit with the extracted data;
   conversion unit converting said data unit into one of plural predefined kinds of specific data; and
   transmission unit transmitting said specific data in the blanking period of the second and/or the third channel as said control information.

14. The data transmission apparatus according to claim 13, wherein the combining unit divides each digital audio data unit by one bit from a same bit-position in each digital audio data unit.

15. The data transmission apparatus according to claim 13, wherein the number of said specific data transmitted in one blanking period is switched between a first number and a second number.

16. The data transmission apparatus according to claim 13, wherein at least one digital audio data unit is transmitted in the blanking period.

17. The data transmission apparatus according to claim 13, wherein a remainder of the blanking period following the specific data produced from the digital audio data unit is filled with zero data.

18. The data transmission apparatus according to claim 13, wherein said digital audio data unit is compressed according to a predetermined method.

19. A data transmission method for transmitting image data using first, second and third channels; synchronizing signal data is provided in a blanking period of the first channel and control information is provided in the blanking period of the second and/or third channels; the method comprising the steps of:

combining a plurality of digital audio data units, wherein each digital audio data unit includes a parity code;

extracting a predetermined length of data from each of said combined digital audio data units;

forming a data unit with the extracted data;

converting said data unit into one of plural predefined kinds of specific data; and transmitting said specific data in the blanking period of the second and/or the third channel as said control information.

20. The data transmission method according to claim 19, wherein the combining step divides each digital audio data unit by one bit from a same bit-position in each digital audio data unit.

21. The data transmission method according to claim 19, wherein the number of said specific data unit transmitted in one blanking period is switched between a first number and a second number.

22. The data transmission method according to claim 19, wherein at least one digital audio data unit is transmitted in the blanking period.

23. The data transmission method according to claim 19, wherein a remainder of the blanking period following the specific data produced from the digital audio data unit is filled with zero data.

24. The data transmission method according to claim 19, wherein said digital audio data unit is compressed according to a predetermined method.

* * * * *